US009560891B2

United States Patent
Higami et al.

(10) Patent No.: US 9,560,891 B2
(45) Date of Patent: Feb. 7, 2017

(54) POLYESTER-BASED FIBER FOR ARTIFICIAL HAIR AND HAIR ORNAMENT PRODUCT INCLUDING THE SAME, AND METHOD FOR PRODUCING THE SAME

(71) Applicant: KANEKA CORPORATION, Osaka-shi, Osaka (JP)

(72) Inventors: Tomokazu Higami, Osaka (JP); Tomomichi Hashimoto, Osaka (JP); Kohei Kawamura, Osaka (JP); Mika Yorizane, Osaka (JP)

(73) Assignee: Kaneka Corporation, Osaka (JP)

( * ) Notice: Subject to any disclaimer, the term of this patent is extended or adjusted under 35 U.S.C. 154(b) by 46 days.

(21) Appl. No.: 14/400,752

(22) PCT Filed: May 15, 2013

(86) PCT No.: PCT/JP2013/063589
§ 371 (c)(1),
(2) Date: Nov. 12, 2014

(87) PCT Pub. No.: WO2013/172387
PCT Pub. Date: Nov. 21, 2013

(65) Prior Publication Data
US 2015/0126644 A1    May 7, 2015

(30) Foreign Application Priority Data

May 16, 2012   (JP) .................................. 2012-112585

(51) Int. Cl.
C08L 67/02    (2006.01)
C08K 3/32     (2006.01)
(Continued)

(52) U.S. Cl.
CPC ............. *A41G 3/0083* (2013.01); *A41G 5/004* (2013.01); *A63H 3/44* (2013.01); *C08L 67/02* (2013.01);
(Continued)

(58) Field of Classification Search
CPC .................. D01F 1/07; D01F 6/62; D01F 6/92
See application file for complete search history.

(56) References Cited

U.S. PATENT DOCUMENTS 7,138,178 B2    11/2006 Fujiwara et al.
7,906,209 B2    3/2011  Higami et al.
(Continued)

FOREIGN PATENT DOCUMENTS

CN      1646740    7/2005
CN      1930330    3/2007
(Continued)

OTHER PUBLICATIONS

Machine translated English language equivalent of JP 2007-084952 (Apr. 2007, 14 pages).*
Office Action issued in corresponding Chinese Application No. 201380023880.8, mailed Apr. 14, 2015, 6 pages.
Notice of Allowance issued in corresponding Korean Application No. 10-2014-7027606, mailed May 7, 2015, 3 pages.

*Primary Examiner* — Brieann R Fink
(74) *Attorney, Agent, or Firm* — Hamre, Schumann, Mueller & Larson, P.C.

(57) ABSTRACT

The present invention relates to a polyester-based fiber for artificial hair obtained by melt spinning a polyester resin composition. The polyester resin composition includes 100 parts by weight of a polyester resin, 5 to 40 parts by weight of a brominated epoxy flame retardant, and 1.5 parts by weight or more and less than 7 parts by weight of an antimony oxide. The polyester resin is at least one kind of resin selected from the group consisting of polyalkylene terephthalate and a copolymerized polyester containing polyalkylene terephthalate as a main component. The poly- (Continued)

ester-based fiber for artificial hair has aggregates of the brominated epoxy flame retardant that are dispersed in the polyester resin in the form of islands, as viewed in the cross section of the fiber parallel to the fiber axis direction. The present invention also relates to hair ornament products including the polyester-based fiber for artificial hair and a method for producing the polyester-based fiber for artificial hair. Thus, the present invention provides a polyester-based fiber for artificial hair having a gloss and a texture that are similar to those of human hair, and hair ornament products including the polyester-based fiber for artificial hair.

12 Claims, 4 Drawing Sheets

(51) Int. Cl.

| | | |
|---|---|---|
| *A41G 3/00* | (2006.01) |
| *D01F 6/92* | (2006.01) |
| *D01F 1/07* | (2006.01) |
| *A63H 3/44* | (2006.01) |
| *A41G 5/00* | (2006.01) |
| *D01F 6/62* | (2006.01) |

(52) U.S. Cl.
CPC . *D01F 1/07* (2013.01); *D01F 6/92* (2013.01); *A41G 3/00* (2013.01); *A41G 5/00* (2013.01); *D01F 6/62* (2013.01); *D10B 2331/04* (2013.01); *D10B 2503/08* (2013.01)

(56) References Cited

U.S. PATENT DOCUMENTS

| | | |
|---|---|---|
| 2005/0245647 A1 | 11/2005 | Masuda et al. |
| 2006/0024497 A1 | 2/2006 | Fujiwara et al. |
| 2006/0154062 A1 | 7/2006 | Kowaki et al. |
| 2006/0194044 A1 | 8/2006 | Kowaki et al. |
| 2006/0276573 A1 | 12/2006 | Masuda et al. |
| 2007/0184264 A1 | 8/2007 | Masuda |
| 2008/0233395 A1 | 9/2008 | Masuda |
| 2009/0266372 A1 | 10/2009 | Higami et al. |

FOREIGN PATENT DOCUMENTS

| | | |
|---|---|---|
| CN | 101514498 | 8/2009 |
| CN | 101713107 | 5/2010 |
| EP | 1 479 798 | 11/2004 |
| EP | 1 550 380 | 7/2005 |
| EP | 1 728 900 | 12/2006 |
| JP | 2005-042234 | 2/2005 |
| JP | 2007084952 A * | 4/2007 |
| KR | 10-2005-0026552 | 3/2005 |
| KR | 10-2006-0064696 | 6/2006 |
| KR | 10-2007-0001150 | 1/2007 |
| KR | 10-2009-0071547 | 7/2009 |
| WO | 2006/085554 | 8/2006 |

* cited by examiner

POLYESTER-BASED FIBER FOR ARTIFICIAL HAIR AND HAIR ORNAMENT PRODUCT INCLUDING THE SAME, AND METHOD FOR PRODUCING THE SAME

TECHNICAL FIELD

The present invention relates to a polyester-based fiber for artificial hair that can be used as an alternative to human hair. Specifically, the present invention relates to a polyester-based fiber for artificial hair having a gloss and a texture that are similar to those of human hair, hair ornament products including the polyester-based fiber for artificial hair, and a method for producing the polyester-based fiber for artificial hair.

BACKGROUND ART

Conventionally, human hair has been used as a hair fiber material for hair ornament products such as hair wigs, hairpieces, hair extensions, hair accessories, and doll hair. In recent years, however, it becomes difficult to obtain the human hair. Therefore, the human hair has been supplanted by various artificial hair fibers including, e.g., an acrylic fiber such as a modacrylic fiber, a polyvinyl chloride fiber, and a polyester-based fiber. The artificial hair fibers such as the polyester-based fiber have a high gloss on the fiber surface. When the artificial hair fibers are used for hair ornament products, particularly for hair ornament products attached to the human hair such as hair wigs and hairpieces, the whole hair looks uncomfortable due to the difference in gloss between the human hair and the artificial hair fibers.

Thus, as a method for adjusting the gloss, Patent Document 1 proposes a technology for adjusting the gloss of a polyester-based fiber for artificial hair by incorporating organic particles or inorganic particles into the polyester-based fiber. This technology uses the fine particles to form projections on the fiber surface.

The artificial hair fibers are required to have a black-based dark color, which is more similar to that of the human hair. However, the artificial hair fibers of a dark color tend to be too glossy because of the contrast difference with the reflected light. Therefore, the gloss of the artificial hair fibers needs to be reduced further.

PRIOR ART DOCUMENTS

Patent Documents

Patent Document 1: JP 2005-42234 A

DISCLOSURE OF INVENTION

Problem to be Solved by the Invention

In the conventional technology, the addition of the organic particles or the inorganic particles makes the polyester-based fiber rough to the touch, so that the polyester-based fiber is far different from the human hair. Accordingly, it has been difficult to provide a polyester-based fiber for artificial hair having a gloss and a texture that are similar to those of the human hair.

The present invention solves the above conventional problems and provides a polyester-based fiber for artificial hair having a gloss and a texture that are similar to those of the human hair, hair ornament products including the polyester-based fiber for artificial hair, and a method for producing the polyester-based fiber for artificial hair.

Means for Solving Problem

The present invention relates to a polyester-based fiber for artificial hair obtained by melt spinning a polyester resin composition. The polyester resin composition includes 100 parts by weight of a polyester resin, 5 to 40 parts by weight of a brominated epoxy flame retardant, and 1.5 parts by weight or more and less than 7 parts by weight of an antimony oxide. The polyester resin is at least one kind of resin selected from the group consisting of polyalkylene terephthalate and a copolymerized polyester containing polyalkylene terephthalate as a main component. The polyester-based fiber for artificial hair has aggregates of the brominated epoxy flame retardant that are dispersed in the polyester resin in the form of islands, as viewed in the cross section of the fiber parallel to the fiber axis direction.

It is preferable that the polyester-based fiber for artificial hair of the present invention has 50 or more aggregates of the brominated epoxy flame retardant, each aggregate having a length-to-width ratio of 2 to 20 and a diagonal width of 0.05 μm or more, per 360 μm$^2$ in the cross section of the fiber parallel to the fiber axis direction. It is more preferable that the polyester-based fiber for artificial hair has 40 or more aggregates of the brominated epoxy flame retardant, each aggregate having a length-to-width ratio of 2.5 to 100/7 and a diagonal width of 0.07 μm or more, per 360 μm$^2$ in the cross section of the fiber parallel to the fiber axis direction. It is further preferable that the polyester-based fiber for artificial hair has 10 or more aggregates of the brominated epoxy flame retardant, each aggregate having a length-to-width ratio of 20/7 to 100/9 and a diagonal width of 0.09 μm or more, per 360 μm$^2$ in the cross section of the fiber parallel to the fiber axis direction. Moreover, it is preferable that the polyester-based fiber for artificial hair of the present invention has 300 or more aggregates of the brominated epoxy flame retardant, each aggregate having a diagonal width of 0.15 μm or more and less than 0.8 μm and a length-to-width ratio of more than 0 and less than 6, per 3036 μm$^2$ in the cross section of the fiber parallel to the fiber axis direction, and also has 20 or less aggregates of the brominated epoxy flame retardant, each aggregate having a diagonal width of 0.8 μm or more, per 3036 μm$^2$ in the cross section of the fiber parallel to the fiber axis direction. Moreover, it is preferable that the polyester-based fiber for artificial hair of the present invention includes 0.1 to 2 wt % of a pigment or a dye in the fiber.

The present invention also relates to a hair ornament product including the above polyester-based fiber for artificial hair.

In the present invention, the hair ornament product may be any one selected from the group consisting of a hair wig, a hairpiece, weaving hair, a hair extension, braided hair, a hair accessory, and doll hair.

The present invention also relates to a method for producing a polyester-based fiber for artificial hair using a polyester resin composition. The polyester resin composition includes 100 parts by weight of a polyester resin, 5 to 40 parts by weight of a brominated epoxy flame retardant, and 1.5 parts by weight or more and less than 7 parts by weight of an antimony oxide. The polyester resin is at least one kind of resin selected from the group consisting of polyalkylene terephthalate and a copolymerized polyester containing polyalkylene terephthalate as a main component. The method includes melt spinning the polyester resin composition to form a polyester-based fiber for artificial hair that has aggregates of the brominated epoxy flame retardant that are dispersed in the polyester resin in the form of islands, as viewed in the cross section of the fiber parallel to the fiber axis direction.

Effects of the Invention

According to the present invention, in the polyester-based fiber for artificial hair, a certain amount of the brominated epoxy flame retardant and a certain amount of the antimony oxide are used together to form aggregates of the brominated epoxy flame retardant, so that the gloss of the polyester-based fiber for artificial hair is adjusted to resemble the human hair. Thus, the present invention can provide a polyester-based fiber for artificial hair that has a gloss similar to the human hair and maintains a soft texture similar to the human hair, and also can provide hair ornament products including the polyester-based fiber for artificial hair. Moreover, the present invention can provide a polyester-based fiber for artificial hair that has a dark color and a gloss similar to the human hair and maintains a soft texture similar to the human hair, and also can provide hair ornament products including the polyester-based fiber for artificial hair. The production method of the present invention can produce a polyester-based fiber for artificial hair that has a gloss similar to the human hair and maintains a soft texture similar to the human hair.

DESCRIPTION OF THE INVENTION

Figure 1:
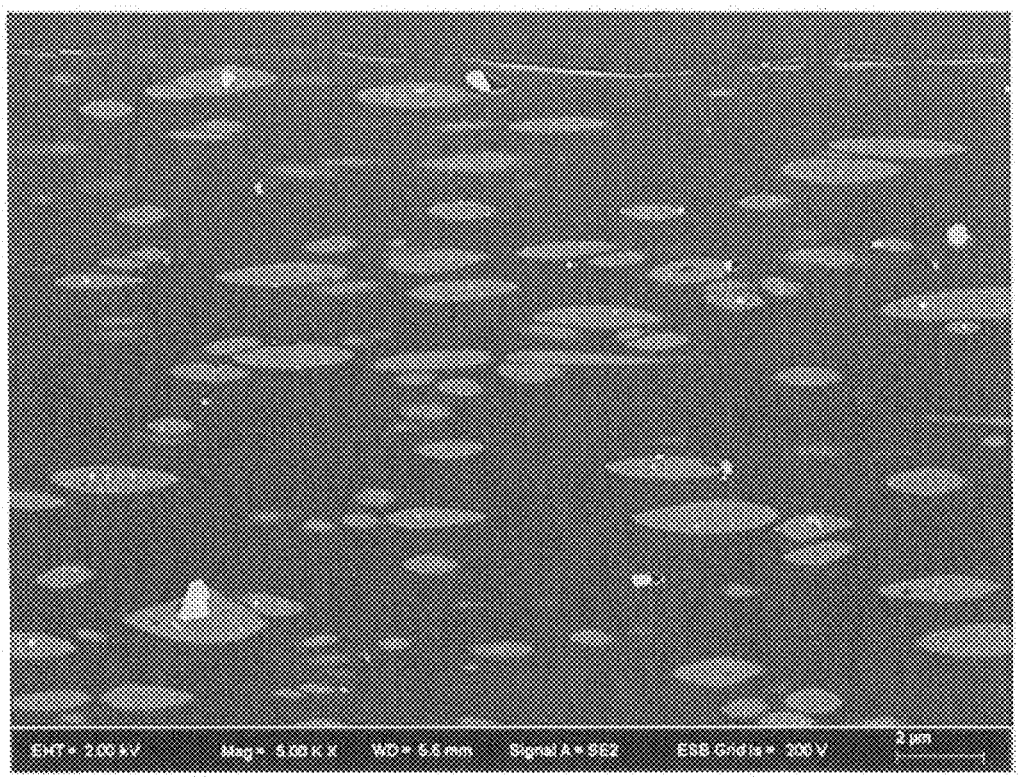
FIG. 1 is a scanning electron micrograph (5000×) of a cross section parallel to the fiber axis direction of a polyester-based fiber for artificial hair in Example 1 of the present invention.
Figure 2:
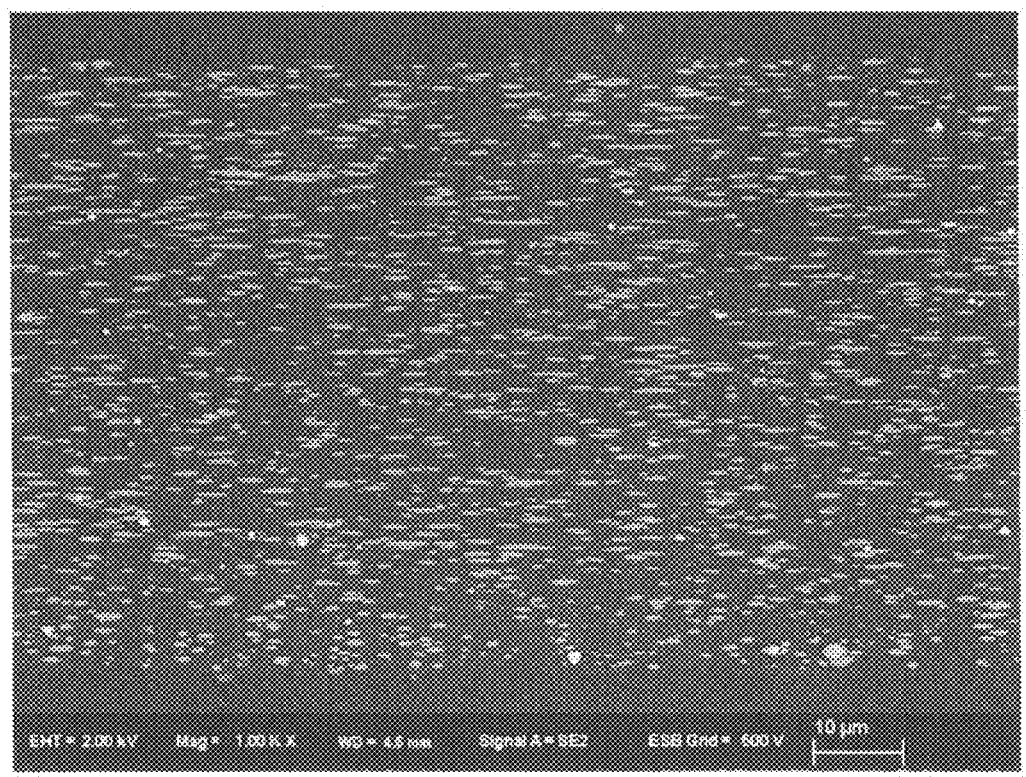
FIG. 2 is a scanning electron micrograph (1000×) of a cross section parallel to the fiber axis direction of a polyester-based fiber for artificial hair in Example 3 of the present invention.
Figure 3:
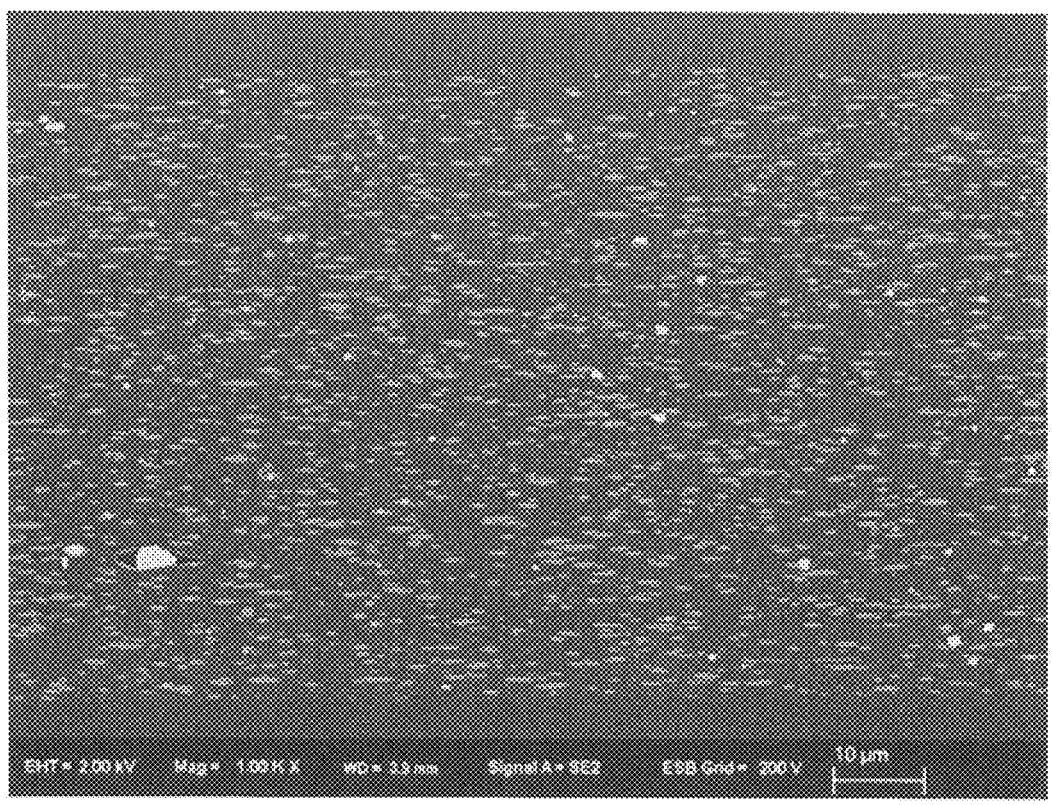
FIG. 3 is a scanning electron micrograph (1000×) of a cross section parallel to the fiber axis direction of a polyester-based fiber for artificial hair in Example 4 of the present invention.
Figure 4:
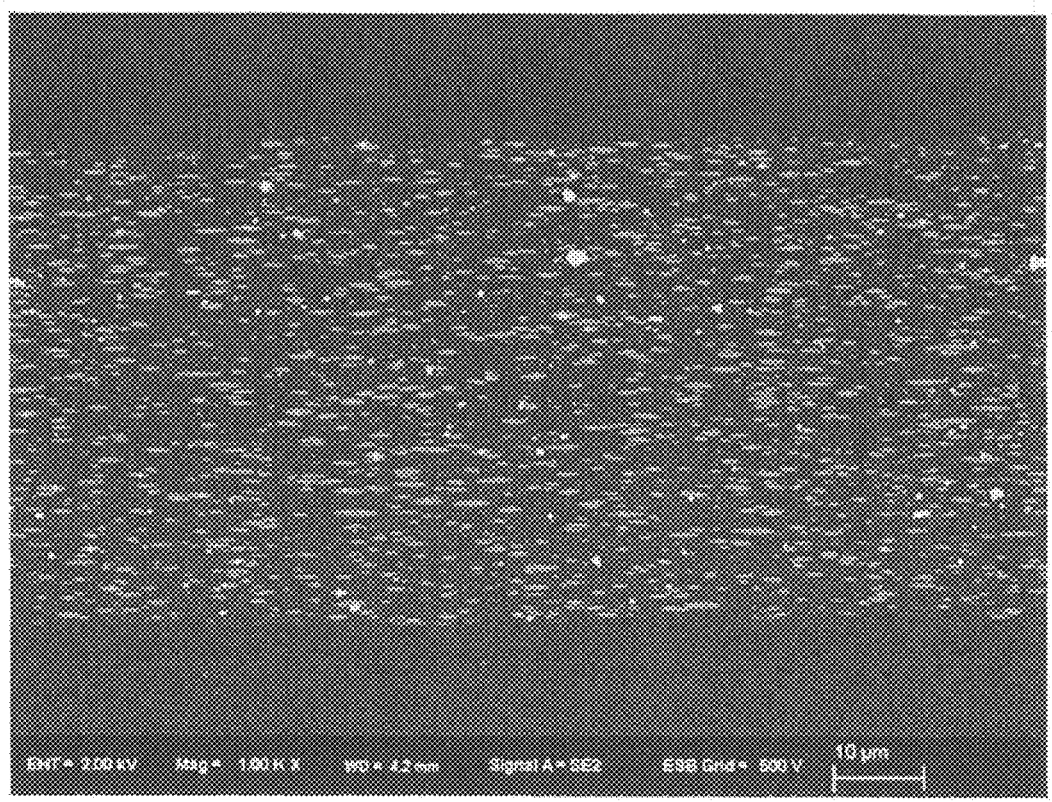
FIG. 4 is a scanning electron micrograph (1000×) of a cross section parallel to the fiber axis direction of a polyester-based fiber for artificial hair in Example 5 of the present invention.
Figure 5:
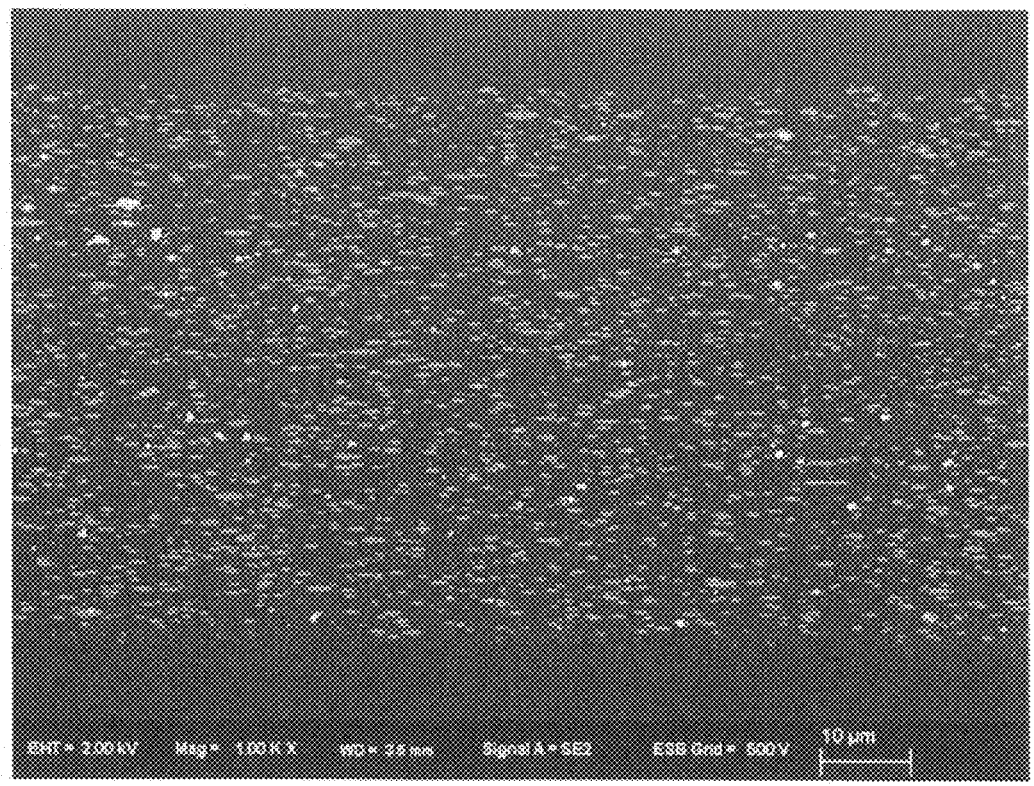
FIG. 5 is a scanning electron micrograph (1000×) of a cross section parallel to the fiber axis direction of a polyester-based fiber for artificial hair in Example 8 of the present invention.
Figure 6:
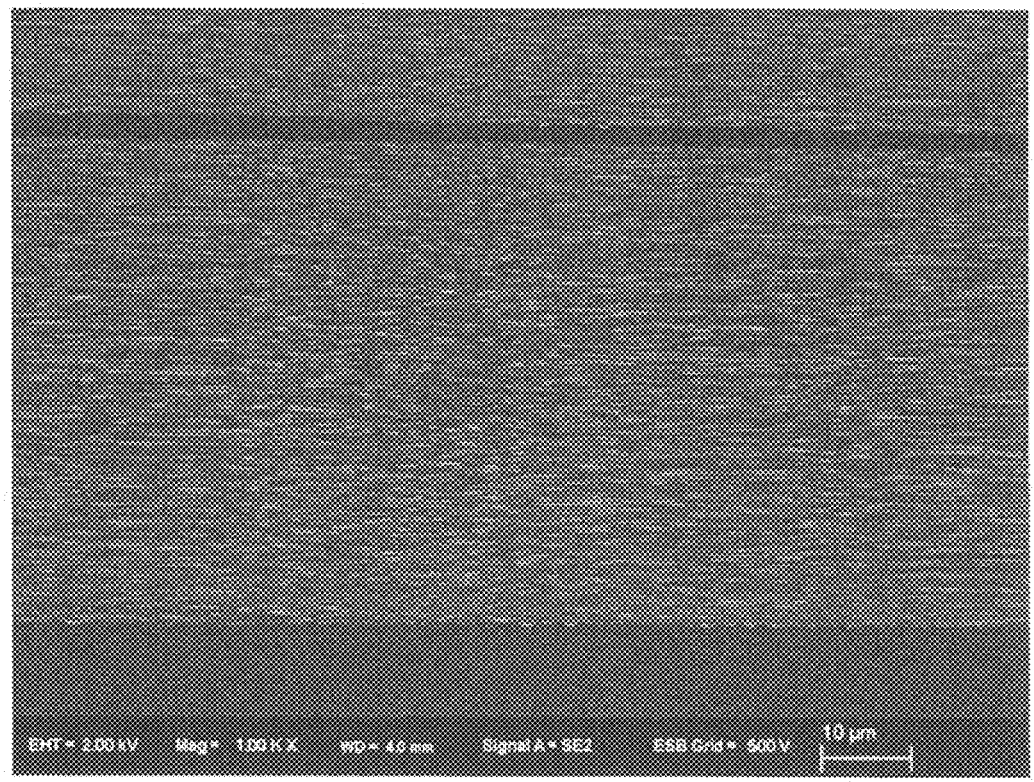
FIG. 6 is a scanning electron micrograph (1000×) of a cross section parallel to the fiber axis direction of a polyester-based fiber for artificial hair in Comparative Example 3 of the present invention.
Figure 7:
FIG. 7 is a scanning electron micrograph (1000×) of a cross section parallel to the fiber axis direction of a polyester-based fiber for artificial hair in Comparative Example 4 of the present invention.

The present inventors have conducted numerous studies to solve the above problems and found out that when a certain amount of a brominated epoxy flame retardant and a certain amount of an antimony oxide are incorporated into a polyester-based fiber, the antimony oxide acts as a catalyst for the reaction of the brominated epoxy flame retardant, and the brominated epoxy flame retardant is formed into lumps (aggregates) with a predetermined size, so that the surface of the polyester-based fiber for artificial hair is made uneven, and thus the gloss of the polyester-based fiber can be suppressed and be close to the human hair, while a soft texture similar to the human hair is imparted to the polyester-based fiber. As a result, the present inventors have reached the present invention.

The polyester-based fiber for artificial hair of the present invention is obtained by melt spinning a polyester resin composition. The polyester resin composition includes a polyester resin, a brominated epoxy flame retardant, and an antimony oxide.

The polyester resin is at least one kind of resin selected from the group consisting of polyalkylene terephthalate and a copolymerized polyester containing polyalkylene terephthalate as the main component. The polyalkylene terephthalate is not particularly limited and may be, e.g., polyethylene terephthalate, polypropylene terephthalate, polybutylene terephthalate, or polycyclohexane dimethylene terephthalate. The copolymerized polyester containing polyalkylene terephthalate as the main component is not particularly limited and may be, e.g., a copolymerized polyester containing polyalkylene terephthalate (such as polyethylene terephthalate, polypropylene terephthalate, polybutylene terephthalate, or polycyclohexane dimethylene terephthalate) as the main component and other copolymerizable components. In the present invention, the term "main component" means "containing the component in an amount of 80 mol % or more". Thus, the "copolymerized polyester containing polyalkylene terephthalate as the main component" refers to the copolymerized polyester containing 80 mol % or more of polyalkylene terephthalate.

Examples of the other copolymerizable components include the following: polycarboxylic acids such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and their derivatives; dicarboxylic acids including a sulfonic acid salt such as 5-sodiumsulfoisophthalic acid and dihydroxyethyl 5-sodiumsulfoisophthalate, and their derivatives; 1,2-propanediol; 1,3-propanediol; 1,4-butanediol; 1,6-hexanediol; neopentyl glycol; 1,4-cyclohexanedimethanol; diethylene glycol; polyethylene glycol; trimethylolpropane; pentaerythritol; 4-hydroxybenzoic acid; ε-caprolactone; and ethylene glycol ether of bisphenol A.

The specific examples of the copolymerized polyester containing polyalkylene terephthalate as the main component include a copolymerized polyester obtained by copolymerization of polyethylene terephthalate as the main component with one kind of compound selected from the group consisting of ethylene glycol ether of bisphenol A, 1,4-cyclohexanedimethanol, isophthalic acid, and dihydroxyethyl 5-sodiumsulfoisophtalate.

The polyalkylene terephthalate and the copolymerized polyester containing polyalkylene terephthalate as the main component may be used individually or in combinations of two or more. In particular, it is preferable that polyethylene terephthalate, polypropylene terephthalate, polybutylene terephthalate, a copolymerized polyester obtained by copolymerization of polyethylene terephthalate as the main component with ethylene glycol ether of bisphenol A, a copolymerized polyester obtained by copolymerization of polyethylene terephthalate as the main component with 1,4-cyclohexanedimethanol, a copolymerized polyester obtained by copolymerization of polyethylene terephthalate as the main component with isophthalic acid, and a copolymerized polyester obtained by copolymerization of polyethylene terephthalate as the main component with dihydroxyethyl 5-sodiumsulfoisophthalate are used individually or in combinations of two or more.

The polyester resin composition includes 5 to 40 parts by weight of the brominated epoxy flame retardant with respect to 100 parts by weight of the polyester resin. The polyester resin composition includes preferably 10 to 30 parts by weight, and more preferably 15 to 25 parts by weight of the brominated epoxy flame retardant with respect to 100 parts by weight of the polyester resin. When the content of the brominated epoxy flame retardant is within the above ranges, the brominated epoxy flame retardant can react with each other by the action of the antimony oxide to form aggregates that are dispersed in the polyester resin in the form of islands, and thus an excellent effect of adjusting the gloss can be obtained.

The brominated epoxy flame retardant may use as a raw material a brominated epoxy flame retardant having an epoxy group or tribromophenol at the end of the molecule. The structure of the brominated epoxy flame retardant after melt kneading is not particularly limited and may have 80 mol % or more of the constitutional unit represented by the following chemical formula (1), where the total amount of the constitutional unit represented by the chemical formula (1) and another constitutional unit in which at least part of the chemical formula (1) is modified is 100 mol %. The structure of the brominated epoxy flame retardant at the end of the molecule may be changed after melt kneading. For example, the end of the molecule of the brominated epoxy flame retardant may be replaced by a hydroxyl group other than the epoxy group or tribromophenol, a phosphoric acid, a phosphonic acid, or the like. Alternatively, the end of the molecule of the brominated epoxy flame retardant may be bound to a polyester component through an ester group. Moreover, part of the structure of the brominated epoxy flame retardant, except for the end of the molecule, may be changed. For example, the brominated epoxy flame retardant may have a branched structure in which the secondary hydroxyl group and the epoxy group are bound. Also, part of the bromine of the chemical formula (1) may be eliminated or added, as long as the bromine content in the molecule of the brominated epoxy flame retardant is not changed significantly.

(化学式 1)

The brominated epoxy flame retardant is preferably a polymeric brominated epoxy flame retardant, e.g., as represented by the following general formula (2). The polymeric brominated epoxy flame retardant represented by the general formula (2) may be a commercially available product such as a brominated epoxy flame retardant (trade name "SR-T2MP") manufactured by SAKAMOTO YAKUHIN KOGYO CO., LTD.

(化学式 2)

In the above general formula (2), m is 1 to 1000.

The polyester resin composition includes 1.5 parts by weight or more and less than 7 parts by weight of the antimony oxide with respect to 100 parts by weight of the polyester resin. When the content of the antimony oxide is within the above range, the antimony oxide readily acts as a catalyst for the reaction of the brominated epoxy flame retardant, and makes it easy for the brominated epoxy flame retardant to disperse in the polyester resin in the form of islands and to form an appropriate size and number of aggregates, as will be described later. If the content of the antimony oxide is less than 1.5 parts by weight with respect to 100 parts by weight of the polyester resin, the brominated epoxy flame retardant is not likely to form aggregates that are dispersed in the polyester resin in the form of islands, as viewed in the cross section of the fiber parallel to the fiber axis direction. Therefore, it is difficult to obtain the effect of suppressing the gloss. On the other hand, if the content of the antimony oxide is 7 parts by weight or more with respect to 100 parts by weight of the polyester resin, the aggregates of the brominated epoxy flame retardant become too large, as viewed in the cross section of the fiber parallel to the fiber axis direction. Therefore, it is likely that the gloss is suppressed excessively, and the color development is reduced. Thus, the resultant polyester-based fiber looks much less natural than the human hair. Moreover, if the content of the antimony oxide is 7 parts by weight or more with respect to 100 parts by weight of the polyester resin, both the texture and the combing properties are poor. In view of the excellent effect of adjusting the gloss, the content of the antimony oxide is preferably 1.5 to 5 parts by weight, more preferably 1.5 to 4 parts by weight, and further preferably 1.5 to 3 parts by weight with respect to 100 parts by weight of the polyester resin.

Examples of the antimony oxide include antimony trioxide, antimony tetroxide, and antimony pentoxide. These antimony oxides may be used individually or in combinations of two or more. In the polyester-based fiber for artificial hair, the brominated epoxy flame retardant and the antimony oxide have the effect of adjusting the gloss. In addition to the effect of adjusting the gloss, the brominated epoxy flame retardant and the antimony oxide may have the functions of a flame retardant and a flame retardant auxiliary, respectively. Moreover, the polyester-based fiber for artificial hair may include other flame retardants other than the brominated epoxy flame retardant and other flame retardant auxiliaries other than the antimony oxide, as long as they do not interfere with the effects of the present invention.

The other flame retardant auxiliaries may include metal antimonate. The metal antimonate is not particularly limited and may be, e.g., sodium antimonate or potassium antimonate. The other flame retardants may include, e.g., phosphorus-containing flame retardants and other bromine-containing flame retardants other than the brominated epoxy flame retardant. Examples of the phosphorus-containing flame retardants include a phosphoric ester amide compound and an organic cyclic phosphorus based compound. Examples of the other bromine-containing flame retardants include the following: pentabromotoluene; hexabromobenzene; decabromodiphenyl; decabromodiphenyl ether; bis(tribromophenoxy)ethane; tetrabromophthalic anhydride; ethylene bis(tetrabromophthalimide); ethylene bis(pentabromophenyl); octabromotrimethylphenylindan; bromine-containing phosphoric esters such as tris(tribromoneopentyl) phosphate; brominated polystyrenes; brominated polybenzyl acrylates; brominated phenoxy resin; brominated polycarbonate oligomers; tetrabromobisphenol A and tetrabromobisphenol A derivatives such as tetrabromobisphenol A-bis(2,3-dibromopropyl ether), tetrabromobisphenol A-bis(allylether), and tetrabromobisphenol A-bis(hydroxyethyl ether); bromine-containing triazine compounds such as tris(tribromophenoxy)triazine; and bromine-containing isocyanuric acid compounds such as tris(2,3-dibromopropyl)isocyanurate. In particular, the phosphoric ester amide compound, the organic cyclic phosphorus based compound, and the brominated phenoxy resin flame retardant are preferred because of their excellent flame retardancy.

In the polyester-based fiber for artificial hair, the brominated epoxy flame retardant is formed into aggregates that are dispersed in the polyester resin in the form of islands.

It is preferable that the polyester-based fiber for artificial hair has 50 or more aggregates of the brominated epoxy flame retardant, each aggregate having a length-to-width ratio of 2 to 20 and a diagonal width of 0.05 μm or more, per 360 μm² in the cross section of the fiber parallel to the fiber axis direction. With this configuration, the surface of the polyester-based fiber for artificial hair can be made uneven appropriately, and thus the gloss of the polyester-based fiber can be adjusted to resemble the human hair, while a soft texture can be imparted to the polyester-based fiber. Moreover, good combing properties also can be maintained. It is more preferable that the polyester-based fiber for artificial hair has 40 or more aggregates of the brominated epoxy flame retardant, each aggregate having a length-to-width ratio of 2.5 to 100/7 and a diagonal width of 0.07 μm or more, per 360 μm² in the cross section of the fiber parallel to the fiber axis direction. It is further preferable that the polyester-based fiber for artificial hair has 10 or more aggregates of the brominated epoxy flame retardant, each aggregate having a length-to-width ratio of 20/7 to 100/9 and a diagonal width of 0.09 μm or more, per 360 μm² in the cross section of the fiber parallel to the fiber axis direction. In the above description, the length-to-width ratio of 2 to 20 corresponds to a flatness ratio of 0.05 to 0.5, the length-to-width ratio of 2.5 to 100/7 corresponds to a flatness ratio of 0.07 to 0.4, and the length-to-width ratio of 20/7 to 100/9 corresponds to a flatness ratio of 0.09 to 0.35.

It is preferable that the polyester-based fiber for artificial hair has 300 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also has 20 or less aggregates of the brominated epoxy flame retardant, each aggregate having a diagonal width of 0.8 μm or more, per 3036 μm² in the cross section of the fiber parallel to the fiber axis direction. With this configuration, the surface of the polyester-based fiber for artificial hair can be made uneven appropriately, and thus the gloss of the polyester-based fiber can be adjusted to resemble the human hair, while a soft texture can be imparted to the polyester-based fiber. Moreover, good combing properties also can be maintained. It is more preferable that the polyester-based fiber for artificial hair has 350 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also has 15 or less aggregates of the brominated epoxy flame retardant, each aggregate having a diagonal width of 0.8 μm or more, per 3036 μm² in the cross section of the fiber parallel to the fiber axis direction. It is further preferable that the polyester-based fiber for artificial hair has 400 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also has 10 or less aggregates of the brominated epoxy flame retardant, each aggregate having a diagonal width of 0.8 μm or more, per 3036 μm² in the cross section of the fiber parallel to the fiber axis direction. If the number of aggregates of the brominated epoxy flame retardant with a diagonal width of 0.15 μm or more and less than 0.8 μm and a length-to-width ratio of more than 0 and less than 6 is less than 300, a sufficient effect of suppressing the gloss is not likely to be obtained. If the number of aggregates of the brominated epoxy flame retardant with a diagonal width of 0.8 μm or more is more than 20, there is a possibility that the gloss will be suppressed excessively, and the texture and the combing properties will be reduced.

Figure 8:
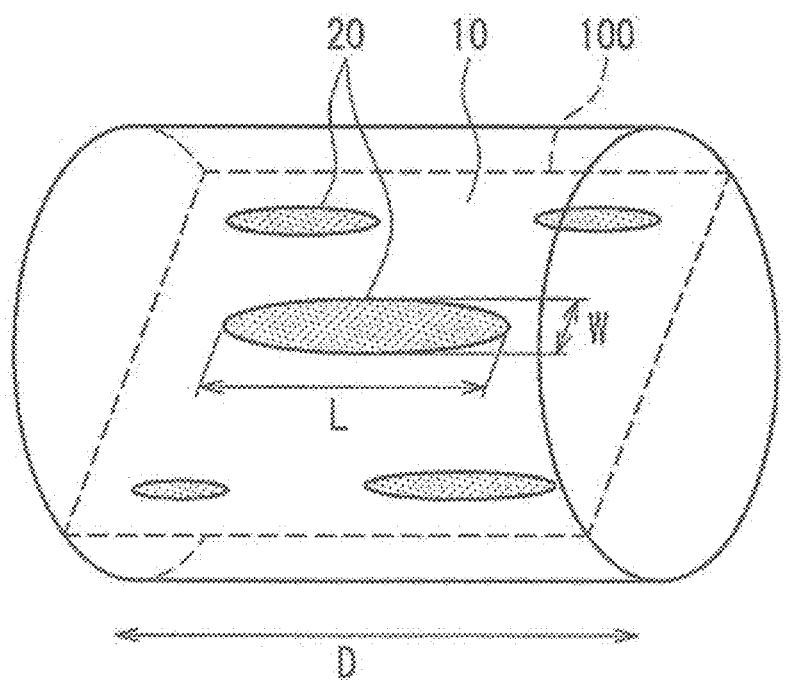
FIG. 8 is a schematic diagram showing the diagonal width and the maximum length of aggregates of a brominated epoxy flame retardant in a cross section parallel to the fiber axis direction of a polyester-based fiber for artificial hair of the present invention.

In the present invention, the diagonal width of an aggregate of the brominated epoxy flame retardant means the largest length of the aggregate in the direction perpendicular to the fiber axis direction, as viewed in the cross section of the fiber parallel to the fiber axis direction. In the present invention, the maximum length of an aggregate of the brominated epoxy flame retardant means the largest length of the aggregate in the direction parallel to the fiber axis direction, as viewed in the cross section of the fiber parallel to the fiber axis direction. In the present invention, the length-to-width ratio of an aggregate of the brominated epoxy flame retardant means the ratio of the maximum length to the diagonal width of the aggregate. In this case, the ratio of the diagonal width to the maximum length of the aggregate of the brominated epoxy flame retardant indicates the flatness ratio. Hereinafter, a detailed explanation will be given based on FIG. 8 that schematically shows the diagonal width and the maximum length of aggregates of the brominated epoxy flame retardant in the cross section parallel to the fiber axis direction of the polyester-based fiber for artificial hair of the present invention. As shown in FIG. 8, the aggregates 20 of the brominated epoxy flame retardant are dispersed in the polyester resin 10 in the form of islands, as viewed in the cross section 100 of the fiber parallel to the fiber axis direction D. In the cross section 100 of the fiber parallel to the fiber axis direction D, the largest length W of the aggregate 20 of the brominated epoxy flame retardant in the direction perpendicular to the fiber axis direction D is the diagonal width W, and the largest length L of the aggregate 20 of the brominated epoxy flame retardant in the direction parallel to the fiber axis direction D is the maximum length L. The length-to-width ratio of the aggregate 20 of the brominated epoxy flame retardant is represented by the maximum length L/the diagonal width W. The flatness ratio of the aggregate 20 of the brominated epoxy flame retardant is represented by the diagonal width W/the maximum length L.

The aggregates of the brominated epoxy flame retardant in the polyester-based fiber for artificial hair can be confirmed by observing the cross section of the fiber parallel to the fiber axis direction, e.g., with a scanning electron microscope (SEM). FIG. 1 shows an SEM photograph (5000×) of the cross section parallel to the fiber axis direction of the polyester-based fiber for artificial hair in an example (Example 1) of the present invention. In FIG. 1, the flat pieces dispersed in the polyester resin in the form of islands are aggregates of the brominated epoxy flame retardant. Moreover, in the present invention, the SEM photograph of the cross section of the fiber parallel to the fiber axis direction can be used to measure the length-to-width ratio, the diagonal width, and the number of aggregates in a certain area of the aggregates of the brominated epoxy flame retardant. In the present invention, the cross section of the fiber parallel to the fiber axis direction can be prepared, e.g., by cross section preparation (ion milling) using a cross section polisher (CP).

The polyester-based fiber for artificial hair may be colored, and preferably colored with a black-based dark color in view of the market demand. In the present invention, the "dark color" means a color having an L value of less than 40 in the Lab color system (also simply referred to as "L value" in the following). The L value can be measured with a general colorimeter. Specifically, e.g., a spectrocolorimeter "CM-2600d" manufactured by Konica Minolta, Inc. may be used. The polyester-based fiber for artificial hair may be colored by dope dyeing or piece dyeing.

In the case of the dope dyeing, the polyester resin composition is prepared by melt kneading a coloring agent along with the components of the polyester resin composition such as the polyester resin and the brominated epoxy flame retardant, and the polyester resin composition including the coloring agent after melt kneading is then melt spun, thereby providing a dope dyed fiber. The coloring agent may be, e.g., a pigment or a dye. Examples of the pigment include a processed pigment that is treated with a dispersing agent or the like, and a masterbatch pigment. Examples of the dye include a processed dye that is treated with a dispersing agent or the like, and a masterbatch dye. These coloring agents may be used individually or in combinations of two or more.

It is preferable that the polyester-based fiber for artificial hair includes 0.1 to 2 wt % of a pigment or a dye in the fiber. If the pigment or the dye is less than 0.1 wt %, the polyester-based fiber is not colored sufficiently and may look dull in color. If the pigment or the dye is more than 2 wt %, the texture may be reduced. The concentration (content) of the pigment or the dye is preferably 0.1 to 2 wt %, and more preferably 0.3 to 1.5 wt % with respect to the polyester resin composition. If the concentration of the pigment or the dye is less than 0.1 wt %, the polyester-based fiber is not colored sufficiently and may look dull in color. If the concentration of the pigment or the dye is more than 2 wt %, the texture may be reduced.

The pigment is not particularly limited, as long as it is used generally. Examples of the pigment include organic pigments of black, yellow, red, brown, etc. and inorganic pigments of black, yellow, red, brown, etc. The dye is not particularly limited, as long as it is used generally. Examples of the dye include organic dyes of black, yellow, red, brown, etc. and inorganic dyes of black, yellow, red, brown, etc. Moreover, two or more types of pigments and dyes may be mixed and toned.

The specific examples of the pigment include carbon black, an anthraquinone-based pigment, and a perinone-based pigment.

In the case of the piece dyeing, the polyester-based fiber for artificial hair can be dyed in the same manner as the dyeing process for dyeing a general polyester-based fiber.

As the dye used for the piece dyeing, e.g., black, yellow, red, and brown dyes may be used as desired. Moreover, two or more types of dyes may be mixed and toned.

The specific examples of the dye include benzene azo-based (monoazo, disazo, etc.) disperse dyes, heterocyclic azo-based (thiazole azo, benzothiazole azo, thiophene azo, etc.) disperse dyes, anthraquinone-based disperse dyes, and condensate-based (quinophthalone, styryl, coumarin, etc.) disperse dyes.

The dyeing is performed preferably at 90 to 150° C., and more preferably at 100 to 140° C. It is preferable that a dye bath containing the dye is adjusted to an appropriate pH.

In the piece dyeing, a dyeing assistant may be used with the dye in order to improve the fixability of the dye and the dispersibility of the dye. The dyeing assistant may be, e.g., a dispersing agent, a level dyeing agent, or an oligomer removing agent.

Specifically, examples of the dyeing assistant include the following: a naphthalenesulfonic acid-formaldehyde condensation product; polyoxyalkylene alkylaryl ether; polyoxyalkylene alkyl ester; polyoxyalkylene alkylaryl ether sulfate ester salt; and polyoxyalkylene aryl ether sulfate ester salt. The dyeing assistant is used preferably in the range of 0.5 to 2 g/L with respect to the dye bath.

As a pH adjustor, e.g., a combination of acetic acid and sodium acetate, a combination of acetic acid and sodium pyrophosphate, or a combination of sodium dihydrogen phosphate or organophosphorus compound and polycarboxylic acid may be used. The pH adjustor is used preferably in the range of 0.5 to 2 g/L with respect to the dye bath.

It is preferable that the dye used for the piece dyeing is exhausted into the polyester-based fiber for artificial hair in an amount of 0.1 mass % or more. The polyester-based fiber for artificial hair has many color variations ranging from dark colors such as black hair, neutral colors such as brown hair and red hair, to light colors such as blonde hair and white (gray) hair. Therefore, the amount of exhaustion of the dye needs to be adjusted appropriately in accordance with the color. The amount of exhaustion of the dye can be adjusted by the concentration of the dye bath, the dyeing temperature, and the dyeing time.

It is preferable that the pigment, the dye, the dying assistant, or the like used for coloring of the polyester-based fiber for artificial hair have weather resistance and flame retardancy.

The polyester-based fiber for artificial hair may include various additives such as a heat-resistant agent, a stabilizer, a fluorescent agent, an antioxidant, and an antistatic agent as needed. The stabilizer may be, e.g., stearyl acid phosphate.

The polyester-based fiber for artificial hair of the present invention can be produced by melt spinning the polyester resin composition to form aggregates of the brominated epoxy flame retardant that are dispersed in the polyester resin in the form of islands, as viewed in the cross section of the fiber parallel to the fiber axis direction.

For example, the polyester resin composition, which is obtained by dry blending the above components such as the polyester resin, the brominated epoxy flame retardant, and the antimony oxide, is melt kneaded using various general kneading machines, and then is formed into pellets. Subsequently, these pellets are melt spun so that the polyester-based fiber for artificial hair can be produced. Examples of the kneading machines include a single-screw extruder, a twin-screw extruder, a roll, a Banbury mixer, and a kneader. In particular, the twin-screw extruder is preferred in terms of the adjustment of the degree of kneading and the ease of operation.

The polyester-based fiber for artificial hair of the present invention may be produced by melt spinning the polyester resin composition with a conventional melt spinning method. In such a case, e.g., the polyester resin composition is melt spun into yarns while the temperatures of an extruder, a gear pump, a spinneret, etc. are set to 250 to 300° C. Then, the spun yarns (undrawn yarns) are allowed to pass through a heated tube, cooled to a temperature of not more than the glass transition point of the polyester resin, and wound up at a speed of 50 to 5000 m/min. Moreover, the spun yarns may be cooled in a water bath containing cooling water so as to control the fineness. The temperature and length of the heated tube, the temperature and amount of the cooling air applied, the temperature of the cooling water bath, the cooling time, and the winding speed can be adjusted appropriately in accordance with the extrusion rate of the polymer and the number of holes of the spinneret.

In the present invention, it is preferable that the resultant spun yarns (undrawn yarns) are hot drawn. The drawing may be performed by either a two-step method or a direct drawing method. In the two-step method, the spun yarns are once wound, and then drawn. In the direct drawing method, the spun yarns are drawn continuously without winding. The hot drawing may be performed by a single-stage drawing method or a multi-stage drawing method that includes two or more stages. The heating means for the hot drawing may be, e.g., a heating roller, a heat plate, a steam jet apparatus, or a hot water bath, and they can be used in combination as desired.

Moreover, oils such as a fiber treatment agent and a softening agent may be added to the polyester-based fiber for artificial hair, so that the texture and feel of the polyester-based fiber can be closer to the human hair. The fiber treatment agent may be, e.g., a silicone-based fiber treatment agent or a non-silicone-based fiber treatment agent, which serve to improve the texture and the combing properties.

The fineness of the polyester-based fiber for artificial hair of the present invention is preferably 10 to 100 dtex, and more preferably 20 to 90 dtex because the fineness within these ranges is suitable for artificial hair.

The polyester-based fiber for artificial hair of the present invention has a gloss and a soft texture that are similar to those of the human hair, and thus can be used suitably as artificial hair. Moreover, the color development and the combing properties are good. The polyester-based fiber for artificial hair of the present invention can be used as artificial hair either individually or in combination with other artificial hair fibers and natural fibers such as human hair and animal hair.

The hair ornament products produced with the use of the polyester-based fiber for artificial hair of the present invention are characterized by an excellent gloss and texture. Moreover, the hair ornament products also have excellent color development and combing properties. The hair ornament products are not particularly limited and may include, e.g., hair wigs, hairpieces, weaving hair, hair extensions, braided hair, hair accessories, and doll hair.

The above hair ornament products may be composed of only the polyester-based fiber for artificial hair of the present invention. Moreover, the hair ornament products may be provided by combining the polyester-based fiber for artificial hair of the present invention with other artificial hair fibers and natural fibers such as human hair or animal hair.

EXAMPLES

Hereinafter, the present invention will be described in more detail based on examples. However, the present invention is not limited to the examples.

The following materials were used in the examples and the comparative examples.

Polyethylene terephthalate: trade name "BK-2180" manufactured by Mitsubishi Chemical Corporation Brominated epoxy flame retardant: trade name "SR-T2MP" manufactured by SAKAMOTO YAKUHIN KOGYO CO., LTD.

Antimony trioxide: trade name "PATOX-M" manufactured by NIHON SEIKO CO., LTD.

Sodium antimonate: trade name "SA-A" manufactured by NIHON SEIKO CO., LTD.

Black pigment: trade name "PESM 22367 BLACK (100) D" manufactured by Dainichiseika Color & Chemicals Mfg. Co., Ltd.

Yellow pigment: trade name "PESM 1001 YELLOW (100) D" manufactured by Dainichiseika Color & Chemicals Mfg. Co., Ltd.

Red pigment: trade name "PESM 3005 RED (100) D" manufactured by Dainichiseika Color & Chemicals Mfg. Co., Ltd.

Examples 1 to 2, Comparative Examples 1 to 2

Each of the materials was dried to a moisture content of 100 ppm or less, and then the materials were dry blended in their respective proportions, as shown in Table 1. The polyester resin composition thus obtained was supplied to a twin-screw extruder (trade name "TEX44" manufactured by Japan Steel Works, LTD.) and melt kneaded at a barrel temperature of 270° C., and then was formed into pellets. The pellets were dried to a moisture content of 100 ppm or less. Next, the dried pellets were supplied to a melt spinning machine (trade name "SV30" manufactured by SHINKO IND. LTD.), and a molten polymer was extruded through a spinneret with nozzle holes having a cocoon-shaped cross section (with an aspect ratio of 1.4:1) at a barrel temperature of 270° C. The extruded polymer was air-cooled with a cooling air at 20° C. and wound up at a speed of 100 m/min, thereby providing undrawn yarns. The resultant undrawn yarns were drawn to 3.5 times using a heating roller at 75° C., heat-treated using the heating roller at 180° C., and wound up at a speed of 30 m/min. Thus, a polyester-based fiber (multifilament) for artificial hair with a single fiber fineness of about 60 dtex was produced.

Examples 3 to 5, Comparative Examples 3 to 6

The materials were mixed in their respective proportions, as shown in Table 1, and the mixture was dried to a moisture content of 100 ppm or less. Then, the above pigments were added to the mixture and dry blended so that the total concentration (content) of the pigments was 0.7 wt %, and the weight ratio of the black pigment, the yellow pigment, and the red pigment was 60:25:15. The polyester resin composition thus obtained was supplied to a twin-screw extruder (trade name "TEX44" manufactured by Japan Steel Works, LTD.) and melt kneaded at a barrel temperature of 270° C., and then was formed into pellets. The pellets were dried to a moisture content of 100 ppm or less. Next, the dried pellets were supplied to a melt spinning machine (trade name "SV30" manufactured by SHINKO IND. LTD.), and a molten polymer was extruded through a spinneret with nozzle holes having a cocoon-shaped cross section (with an aspect ratio of 1.4:1) at a barrel temperature of 270° C. The extruded polymer was air-cooled with a cooling air at 20° C. and wound up at a speed of 100 m/min, thereby providing undrawn yarns. The resultant undrawn yarns were drawn to 3.5 times using a heating roller at 75° C., heat-treated using the heating roller at 180° C., and wound up at a speed of 30 m/min. Thus, a polyester-based fiber (multifilament) for artificial hair with a single fiber fineness of about 65 dtex was produced.

Example 6

A polyester-based fiber (multifilament) for artificial hair was produced in the same manner as Examples 3 to 5 and Comparative Examples 3 to 6, except that the mixture obtained by mixing the materials in their respective proportions, as shown in Table 1, was dried to a moisture content of 100 ppm or less, and then the above pigments were added to the mixture and dry blended so that the total content of the pigments was 0.7 wt %, and the weight ratio of the black pigment, the yellow pigment, and the red pigment was 75:20:5.

Example 7

A polyester-based fiber (multifilament) for artificial hair was produced in the same manner as Examples 3 to 5 and Comparative Examples 3 to 6, except that the mixture obtained by mixing the materials in their respective proportions, as shown in Table 1, was dried to a moisture content of 100 ppm or less, and then the above pigments were added to the mixture and dry blended so that the total content of the pigments was 0.7 wt %, and the weight ratio of the black pigment, the yellow pigment, and the red pigment was 45:25:30.

Example 8

A polyester-based fiber (multifilament) for artificial hair was produced in the same manner as Examples 3 to 5 and Comparative Examples 3 to 6, except that the mixture obtained by mixing the materials in their respective proportions, as shown in Table 1, was dried to a moisture content of 100 ppm or less, and then the above pigments were added to the mixture and dry blended so that the total content of the pigments was 0.02 wt %, and the weight ratio of the black pigment, the yellow pigment, and the red pigment was 10:80:10.

In the polyester-based fibers of Examples 1 to 8 and Comparative Examples 1 to 6, the diagonal width, the length-to-width ratio, the number of aggregates per 360 $\mu m^2$ (standard 1), and the number of aggregates per 3036 $\mu m^2$ (standard 2) of the aggregates of the brominated epoxy flame retardant in the cross section of the fiber parallel to the fiber axis direction were measured in the following manner, and the results of the measurement were shown in Table 1. Moreover, the gloss, color development, texture, and combing properties of the polyester-based fibers of Examples 1 to 8 and Comparative Examples 1 to 6 were evaluated in the following manner, and the results of the evaluation were shown in Table 1. With respect to the gloss, the colorless white fibers of Examples 1 to 2 and Comparative Examples 1 to 2 were evaluated based on the following gloss evaluation 1 using white Chinese hair as a reference. The colored fibers of Examples 3 to 8 and Comparative Examples 3 to 6 were evaluated based on the following gloss evaluation 1 and gloss evaluation 2. First, the L values of black Chinese hair, chestnut Chinese hair, blonde Chinese hair, and white Chinese hair in the Lab color system were measured in the following manner, resulting in 15, 28, 42, and 85, respectively. Then, the L values of the colored fibers of Examples 3 to 8 and Comparative Examples 3 to 6 were measured. In light of the above L values of the human hair, the fiber with an L value of less than 40 was evaluated based on the gloss evaluation 2 using the black Chinese hair as a reference, and the fiber with an L value of 40 or more was evaluated based on the gloss evaluation 1 using the white Chinese hair as a reference. The color development of Examples 3 to 8 and Comparative Examples 3 to 6 was evaluated in the following manner, and the results of the evaluation were shown in Table 1.

(Evaluation of Aggregate of Brominated Epoxy Flame Retardant)

The diagonal width, the length-to-width ratio, and the number of aggregates in a certain area of the aggregates of the brominated epoxy flame retardant were observed and measured in the following analysis method. The preparation (ion milling) of the cross section of the fiber parallel to the fiber axis direction was performed using a cross section polisher (CP) ("SM-09020 CP" manufactured by JEOL Ltd.) under the processing conditions of an acceleration voltage of 6 kV. The morphological observation of the cross section of the fiber parallel to the fiber axis direction was carried out with a field emission scanning electron microscope (FE-SEM) ("ULTRA plus" manufactured by Carl Zeiss Co., Ltd.) at an acceleration voltage of 2 kV. Since a composition image of a sample depends on the average atomic number, the image becomes bright in a portion of the sample that includes heavy elements and becomes dark in a portion of the sample that includes light elements. In this example, the sample included the polyethylene terephthalate, the brominated epoxy flame retardant, and the antimony compound. Therefore, the order in which the bright composition image appeared was (1) antimony compound, (2) brominated epoxy flame retardant, and (3) polyethylene terephthalate. For example, as shown in FIG. 1, the brominated epoxy flame retardant was found to be aggregates that were dispersed in the polyethylene terephthalate in the form of islands. Using the image analysis software ("WinROOF" available from Mitani Corporation), the diagonal width, length-to-width ratio, number of aggregates per 360 $\mu m^2$ (standard 1), and number of aggregates per 3036 $\mu m^2$ (standard 2) of the aggregates of the brominated epoxy flame retardant were measured from the image obtained. For the standard 1, the number of aggregates of the brominated epoxy flame retardant per 360 $\mu m^2$ may be counted directly based on the image without using the image analysis software. However, the use of the image analysis software is preferred because of its high accuracy.

(Gloss Evaluation 1)

A tow filament having a length of 30 cm and a total fineness of 100000 dtex was visually evaluated in the sunlight by the following criteria. The Chinese hair (white hair) was used as human hair.

A: The gloss is equal to that of the human hair.

B: The gloss is approximately equal to that of the human hair.

C: The gloss is slightly different from that of the human hair.

D: The gloss is significantly different from that of the human hair.

(Gloss Evaluation 2)

The gloss was measured with a "SAMBA Hair System" manufactured by Bossa Nova Technologies. A tow filament having a length of 25 cm and a weight of 5 g was used as a sample, and BNT was measured. The average of the BNT values (where n is 5) was defined as a gloss value. The black Chinese hair (with a BNT value of 26) was used as human hair.

A: The gloss is equal to that of the human hair (the BNT value is 15 to 37).

B: The gloss is approximately equal to that of the human hair (the BNT value is 12 or more and less than 15, or the BNT value is more than 37 and 40 or less).

C: The gloss is slightly different from that of the human hair (the BNT value is 10 or more and less than 12, or the BNT value is more than 40 and 43 or less).

D: The gloss is significantly different from that of the human hair (the BNT value is less than 10, or the BNT value is more than 43).

(Color Development)

A tow filament having a length of 30 cm and a total fineness of 100000 dtex was visually evaluated in the sunlight by the following criteria.

A: The tow filament is transparent and deep-colored (bright).

B: The tow filament is somewhat opaque, but the deepness (brightness) of color is not reduced.

C: The tow filament is opaque (cloudy), and the deepness (brightness) of color is slightly reduced.

D: The tow filament is opaque and not deep-colored.

(Texture)

The sensory evaluation was performed by comparison with human hair, and the texture was evaluated by the following criteria.

A: The texture is very soft and equal to that of the human hair.

B: The texture is soft and similar to that of the human hair.

C: The texture is slightly harder than that of the human hair.

D: The texture is harder than that of the human hair.

(Combing Properties)

A tow filament having a length of 30 cm and a total fineness of 100000 dtex was immersed in an aqueous solution containing 3 wt % of a PO/EO random copolymer, i.e., a fiber surface treatment agent (trade name "Conditioner Type-Q" manufactured by MARUBISHI OIL CHEMICAL CO., LTD., molecular weight: 20000) and a cationic antistatic agent (trade name "Processing Oil No. 29" manufactured by MARUBISHI OIL CHEMICAL CO., LTD.) (with a weight ratio of 75:25) so that 0.1 wt % of the PO/EO random copolymer and 0.1 wt % of the cationic antistatic agent were attached to the fiber. Then, the tow filament was dried at 80° C. for 5 minutes. The tow filament thus treated was combed at least 30 times by running a comb made of a polyacetal resin (trade name "NEW DELRIN COMB No. 826" manufactured by Uehara Cell) from a point 3 cm below the top of the tow filament down through it at a speed of 0.3 m/s. Thus, the ease of combing was evaluated.

A: The tow filament is combed with almost no resistance (light).

B: The tow filament is combed with a little resistance (slightly heavy).

C: The tow filament is combed with a large resistance, or the comb is caught in the middle of the tow filament (heavy).

D: The comb cannot pass through the tow filament.

(Measurement of L Value by Lab Color System)

The color of the obtained fiber was measured with a spectrocolorimeter "CM-2600d" (SCI system) manufactured by Konica Minolta, Inc. to determine the L value.

(Colorability)

Dark color: L value of less than 40

Light color: L value of 40 or more

FIG. 1 shows a field emission scanning electron micrograph (5000×) of a cross section parallel to the fiber axis direction of the polyester-based fiber for artificial hair in Example 1. FIGS. 2 to 7 show field emission scanning electron micrographs (1000×) of cross sections parallel to the fiber axis direction of the polyester-based fibers for artificial hair in Examples 3 to 5, 8 and Comparative Examples 3 to 5. As can be seen from FIGS. 1 to 5, in each of the polyester-based fibers for artificial hair of the examples, the brominated epoxy flame retardant formed aggregates that were dispersed in the polyester resin in the form of islands.

TABLE 1

|  | Ex. 1 | Ex. 2 | Ex. 3 | Ex. 4 | Ex. 5 | Ex. 6 | Ex. 7 | Ex. 8 | Comp. Ex. 1 |
|---|---|---|---|---|---|---|---|---|---|
| Polyethylene terephthalate (parts by weight) | 100 | 100 | 100 | 100 | 100 | 100 | 100 | 100 | 100 |
| Brominated epoxy flame retardant (parts by weight) | 20 | 20 | 20 | 20 | 20 | 20 | 20 | 20 | 20 |
| Antimony trioxide (parts by weight) | 2 | 5 | 1.5 | 3 | 5 | 3 | 3 | 3 | 0.2 |
| Sodium antimonate (parts by weight) |  |  |  |  |  |  |  |  |  |
| Pigment (wt %) |  |  | 0.7 | 0.7 | 0.7 | 0.7 | 0.7 | 0.02 |  |
| L value in Lab color system |  |  | 13 | 14 | 14 | 12 | 15 | 75 |  |
| Aggregates of flame retardant |  |  |  |  |  |  |  |  |  |
| Standard 1 (number of aggregates/360 μm$^2$) |  |  |  |  |  |  |  |  |  |
| Diagonal width of 0.05 μm or more and length-to-width ratio of 2 to 20 | 74 | 51 | 87 | 90 | 75 | 75 | 75 | 91 | 4 |
| Diagonal width of 0.07 μm or more and length-to-width ratio of 25 to 100/7 | 71 | 43 | 81 | 74 | 65 | 65 | 65 | 63 | 2 |
| Diagonal width of 0.09 μm or more and length-to-width ratio of 20/7 to 100/9 | 64 | 23 | 77 | 64 | 59 | 59 | 59 | 49 | 1 |
| Standard 2 (number of aggregates/3036 μm$^2$) |  |  |  |  |  |  |  |  |  |
| Diagonal width of 0.15 μm or more and less than 0.8 μm and length-to-width ratio of more than 0 and less than 6 |  |  | 593 | 870 | 677 | 677 | 677 | 1053 |  |
| Diagonal width of 0.8 μm or more |  |  | 4 | 10 | 11 | 11 | 11 | 12 |  |
| Gloss evaluation 1 | A | C |  |  |  |  |  | C | D |
| BNT value |  |  | 30.1 | 20.7 | 14.0 | 26.3 | 26.3 |  |  |
| Gloss evaluation 2 |  |  | A | A | B | A | A |  |  |
| Texture | B | C | B | B | B | B | B | B | B |
| Color development | B | C | B | B | C | B | B | D | B |
| Colorability | uncolored | uncolored | dark color | dark color | dark color | dark color | dark color | light color | uncolored |
| Combing properties | B | C | A | B | C | B | B | B | A |

|  | Comp. Ex. 2 | Comp. Ex. 3 | Comp. Ex. 4 | Comp. Ex. 5 | Comp. Ex. 6 |
|---|---|---|---|---|---|
| Polyethylene terephthalate (parts by weight) | 100 | 100 | 100 | 100 | 100 |
| Brominated epoxy flame retardant (parts by weight) | 20 | 20 | 20 | 20 |  |
| Antimony trioxide (parts by weight) | 7 |  |  | 10 | 2 |
| Sodium antimonate (parts by weight) |  |  | 2 |  |  |

TABLE 1-continued

| | | | | | |
|---|---|---|---|---|---|
| Pigment (wt %) | | 0.7 | 0.7 | 0.7 | 0.7 |
| L value in Lab color system | | 11 | 12 | 17 | 11 |
| Aggregates of flame retardant | | | | | |
| Standard 1 (number of aggregates/360 μm²) | | | | | |
| Diagonal width of 0.05 μm or more and length-to-width ratio of 2 to 20 | 7 | 0 | 0 | 47 | 0 |
| Diagonal width of 0.07 μm or more and length-to-width ratio of 25 to 100/7 | 0 | 0 | 0 | 21 | 0 |
| Diagonal width of 0.09 μm or more and length-to-width ratio of 20/7 to 100/9 | 0 | 0 | 0 | 15 | 0 |
| Standard 2 (number of aggregates/3036 μm²) | | | | | |
| Diagonal width of 0.15 μm or more and less than 0.8 μm and length-to-width ratio of more than 0 and less than 6 | | 0 | 0 | 758 | 0 |
| Diagonal width of 0.8 μm or more | | 0 | 0 | 37 | 0 |
| Gloss evaluation 1 | D | | | | |
| BNT value | | 118.0 | 62.4 | 8.7 | 64.8 |
| Gloss evaluation 2 | | D | D | D | D |
| Texture | D | D | A | D | D |
| Color development | D | A | B | D | A |
| Colorability | uncolored | dark color | dark color | dark color | dark color |
| Combing properties | D | A | A | D | A |

As can be seen from the results of Table 1, the polyester-based fibers for artificial hair of the examples, in each of which the polyester resin composition including 100 parts by weight of the polyester resin, 5 to 40 parts by weight of the brominated epoxy flame retardant, and 1.5 parts by weight or more and less than 7 parts by weight of the antimony oxide was melt spun to form aggregates of the brominated epoxy flame retardant that were dispersed in the polyester resin in the form of islands, had a gloss and a texture that were similar to those of the human hair. Moreover, in the polyester-based fibers for artificial hair of the examples, both the color development and the combing properties were good.

On the other hand, the polyester-based fiber of Comparative Example 3 (FIG. 6) that did not include the antimony oxide and the polyester-based fiber of Comparative Example 6 that did not include the brominated epoxy flame retardant did not have aggregates of the brominated epoxy flame retardant that were dispersed in the polyester resin in the form of islands, and thus significantly differed from the human hair in gloss and texture. The polyester-based fiber of Comparative Example 4 (FIG. 7) that included the sodium antimonate, but did not include the antimony oxide did not have aggregates of the brominated epoxy flame retardant that were dispersed in the polyester resin in the form of islands, and thus significantly differed from the human hair in gloss. In Comparative Example 1 that included less than 1.5 parts by weight of the antimony oxide, the gloss was significantly different from that of the human hair. In Comparative Examples 2 and 5 that included 7 parts by weight or more of the antimony oxide, both the gloss and the texture were significantly different from those of the human hair.

The polyester-based fibers for artificial hair of Examples 1 to 8, in each of which the polyester resin composition including 100 parts by weight of the polyester resin, 5 to 40 parts by weight of the brominated epoxy flame retardant, and 1.5 parts by weight or more and less than 7 parts by weight of the antimony oxide was melt spun, had 50 or more aggregates of the brominated epoxy flame retardant, each aggregate having a length-to-width ratio of 2 to 20 and a diagonal width of 0.05 μm or more, per 360 μm² in the cross section of the fiber parallel to the fiber axis direction. Moreover, the polyester-based fibers for artificial hair of Examples 1 to 8 had 40 or more aggregates of the brominated epoxy flame retardant, each aggregate having a length-to-width ratio of 2.5 to 100/7 and a diagonal width of 0.07 μm or more, per 360 μm² in the cross section of the fiber parallel to the fiber axis direction. Further, the polyester-based fibers for artificial hair of Examples 1 to 8 had 10 or more aggregates of the brominated epoxy flame retardant, each aggregate having a length-to-width ratio of 20/7 to 100/9 and a diagonal width of 0.09 μm or more, per 360 μm² in the cross section of the fiber parallel to the fiber axis direction. Thus, the polyester-based fibers for artificial hair of Examples 1 to 8 had a gloss similar to the human hair and a good texture.

The polyester-based fibers for artificial hair of Examples 1 to 8 had 300 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also had 20 or less aggregates of the brominated epoxy flame retardant, each aggregate having a diagonal width of 0.8 μm or more, per 3036 μm² in the cross section of the fiber parallel to the fiber axis direction. Thus, the polyester-based fibers for artificial hair of Examples 1 to 8 had a gloss similar to the human hair and a good texture. In particular, when the polyester-based fibers were colored with a dark color, they still had a gloss similar to the human hair and a good texture.

On the other hand, the polyester-based fibers of Comparative Examples 1 to 6 had less than 50 aggregates of the brominated epoxy flame retardant, each aggregate having a length-to-width ratio of 2 to 20 and a diagonal width of 0.05 μm or more, per 360 μm² in the cross section of the fiber parallel to the fiber axis direction. Moreover, the polyester-based fibers of Comparative Examples 1 to 6 had less than 300 aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, or had more than 20 aggregates of the brominated epoxy flame retardant, each aggregate having a diagonal width of 0.8 μm or more, per 3036 μm² in the cross section of the fiber parallel to the fiber axis direction. Thus, none of the comparative examples provided a polyester-based fiber for artificial hair having a gloss and a texture that are similar to those of the human hair.

The invention claimed is:

1. A polyester-based fiber for artificial hair obtained by melt spinning a polyester resin composition,
wherein the polyester resin composition comprises 100 parts by weight of a polyester resin, 5 to 40 parts by weight of a brominated epoxy flame retardant, and 1.5 parts by weight or more and less than 7 parts by weight of an antimony oxide,
the polyester resin is at least one kind of resin selected from the group consisting of polyalkylene terephthalate and a copolymerized polyester containing polyalkylene terephthalate as a main component, and
the polyester-based fiber for artificial hair has aggregates of the brominated epoxy flame retardant that are dispersed in the polyester resin in a form of islands, as viewed in a cross section of the fiber parallel to a fiber axis direction, and also has 50 or more aggregates of the brominated epoxy flame retardant, each aggregate having a length-to-width ratio of 2 to 20 and a diagonal width of 0.05 μm or more, per 360 μm² in the cross section of the fiber parallel to the fiber axis direction.

2. The polyester-based fiber for artificial hair according to claim 1, wherein the polyester-based fiber for artificial hair has 300 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also has 20 or less aggregates of the brominated epoxy flame retardant, each aggregate having a diagonal width of 0.8 μm or more, per 3036 μm² in the cross section of the fiber parallel to the fiber axis direction.

3. The polyester-based fiber for artificial hair according to claim 1, wherein the polyester-based fiber for artificial hair has 40 or more aggregates of the brominated epoxy flame retardant, each aggregate having a length-to-width ratio of 2.5 to 100/7 and a diagonal width of 0.07 μm or more, per 360 μm² in the cross section of the fiber parallel to the fiber axis direction.

4. The polyester-based fiber for artificial hair according to claim 1, wherein the polyester-based fiber for artificial hair has 10 or more aggregates of the brominated epoxy flame retardant, each aggregate having a length-to-width ratio of 20/7 to 100/9 and a diagonal width of 0.09 μm or more, per 360 μm² in the cross section of the fiber parallel to the fiber axis direction.

5. The polyester-based fiber for artificial hair according to claim 1, including 0.1 to 2 wt % of a pigment or a dye in the fiber.

6. A hair ornament product comprising the polyester-based fiber for artificial hair according to claim 1.

7. The hair ornament product according to claim 6, wherein the hair ornament product is any one selected from the group consisting of a hair wig, a hairpiece, weaving hair, a hair extension, braided hair, a hair accessory, and doll hair.

8. A method for producing a polyester-based fiber for artificial hair using a polyester resin composition,
wherein the polyester resin composition comprises 100 parts by weight of a polyester resin, 5 to 40 parts by weight of a brominated epoxy flame retardant, and 1.5 parts by weight or more and less than 7 parts by weight of an antimony oxide, and
the polyester resin is at least one kind of resin selected from the group consisting of polyalkylene terephthalate and a copolymerized polyester containing polyalkylene terephthalate as a main component,
the method comprising melt spinning the polyester resin composition to form a polyester-based fiber for artificial hair that has aggregates of the brominated epoxy flame retardant that are dispersed in the polyester resin in a form of islands, as viewed in a cross section of the fiber parallel to a fiber axis direction, and also has 50 or more aggregates of the brominated epoxy flame retardant, each aggregate having a length-to-width ratio of 2 to 20 and a diagonal width of 0.05 μm or more, per 360 μm² in the cross section of the fiber parallel to the fiber axis direction.

9. The hair ornament product according to claim 6, wherein the polyester-based fiber for artificial hair has 300 or more aggregates of the brominated epoxy flame retardant, each aggregate having a diagonal width of 0.15 μm or more and less than 0.8 μm and a length-to-width ratio of more than 0 and less than 6, per 3036 μm² in the cross section of the fiber parallel to the fiber axis direction, and also has 20 or less aggregates of the brominated epoxy flame retardant, each aggregate having a diagonal width of 0.8 μm or more, per 3036 μm² in the cross section of the fiber parallel to the fiber axis direction.

10. The hair ornament product according to claim 6, wherein the polyester-based fiber for artificial hair has 40 or more aggregates of the brominated epoxy flame retardant, each aggregate having a length-to-width ratio of 2.5 to 100/7 and a diagonal width of 0.07 μm or more, per 360 μm² in the cross section of the fiber parallel to the fiber axis direction.

11. The hair ornament product according to claim 6, wherein the polyester-based fiber for artificial hair has 10 or more aggregates of the brominated epoxy flame retardant, each aggregate having a length-to-width ratio of 20/7 to 100/9 and a diagonal width of 0.09 μm or more, per 360 μm² in the cross section of the fiber parallel to the fiber axis direction.

12. The hair ornament product according to claim 6, wherein the polyester-based fiber for artificial hair including 0.1 to 2 wt % of a pigment or a dye in the fiber.

* * * * *